(12) United States Patent
Suyama

(10) Patent No.: US 12,495,199 B2
(45) Date of Patent: Dec. 9, 2025

(54) IMAGE PICKUP UNIT, ENDOSCOPE, AND METHOD FOR MANUFACTURING IMAGE PICKUP UNIT

(71) Applicant: OLYMPUS MEDICAL SYSTEMS CORP., Tokyo (JP)

(72) Inventor: Takuro Suyama, Ina (JP)

(73) Assignee: OLYMPUS MEDICAL SYSTEMS CORP., Tokyo (JP)

( * ) Notice: Subject to any disclaimer, the term of this patent is extended or adjusted under 35 U.S.C. 154(b) by 0 days.

(21) Appl. No.: 18/739,686

(22) Filed: Jun. 11, 2024

(65) Prior Publication Data

US 2024/0334035 A1    Oct. 3, 2024

Related U.S. Application Data

(63) Continuation of application No. PCT/JP2022/020189, filed on May 13, 2022.

(51) Int. Cl.
| | |
|---|---|
| *H04N 23/50* | (2023.01) |
| *H04N 23/54* | (2023.01) |
| *H04N 23/55* | (2023.01) |
| *H10F 39/00* | (2025.01) |

(52) U.S. Cl.
CPC .......... *H04N 23/555* (2023.01); *H04N 23/54* (2023.01); *H04N 23/55* (2023.01); *H10F 39/026* (2025.01)

(58) Field of Classification Search
CPC ...... H04N 23/555; H04N 23/54; H04N 23/55; H10F 39/026
USPC ......................................................... 348/65
See application file for complete search history.

(56) References Cited

U.S. PATENT DOCUMENTS

| | | | |
|---|---|---|---|
| 2002/0015564 A1* | 2/2002 | Asada ................... | G02B 6/4292 385/60 |
| 2005/0129384 A1* | 6/2005 | Nishida ................. | H04N 23/55 385/147 |
| 2005/0163421 A1* | 7/2005 | Kurumada ............. | G01D 5/342 385/18 |
| 2006/0181902 A1* | 8/2006 | Tamura ................ | G02B 6/0068 257/E33.059 |

(Continued)

FOREIGN PATENT DOCUMENTS

| | | |
|---|---|---|
| JP | 2012018993 A | 1/2012 |
| JP | 2017185024 A | 10/2017 |

(Continued)

OTHER PUBLICATIONS

International Search Report dated Aug. 9, 2022 received in PCT/JP2022/020189.

*Primary Examiner* — Matthew David Kim

(74) *Attorney, Agent, or Firm* — Scully, Scott, Murphy & Presser, P.C.

(57) ABSTRACT

An image pickup unit includes: an optical unit which includes a plurality of stacked optical elements and in which at least corners of four side surfaces have a notch being notched from an exit surface toward an incidence surface; an image sensor including a light-receiving surface; and resin which includes a first region between the light-receiving surface and the exit surface, the first region bonding the optical unit and the image sensor to each other, and a second region filling the notch of the optical unit, and which does not include an interface between the first region and the second region.

10 Claims, 12 Drawing Sheets

(56) References Cited

U.S. PATENT DOCUMENTS

| | | | | |
|---|---|---|---|---|
| 2008/0007834 A1* | 1/2008 | Atsuta | G02B 5/28 |
| | | | 359/588 |
| 2009/0058999 A1* | 3/2009 | Gono | A61B 1/00186 |
| | | | 348/71 |
| 2010/0188493 A1* | 7/2010 | Kanzaki | A61B 1/0676 |
| | | | 348/75 |
| 2014/0078276 A1* | 3/2014 | Kaneko | G02B 23/2484 |
| | | | 348/65 |
| 2014/0112107 A1* | 4/2014 | Guo | B06B 1/00 |
| | | | 427/596 |
| 2014/0350338 A1* | 11/2014 | Tanaka | G02B 23/2469 |
| | | | 600/111 |
| 2017/0059848 A1* | 3/2017 | Haraguchi | G02B 23/2469 |
| 2017/0224201 A1* | 8/2017 | Yamamoto | G02B 27/005 |
| 2017/0238785 A1* | 8/2017 | Fujimori | H10F 39/18 |
| 2018/0256014 A1* | 9/2018 | Shinji | A61B 1/07 |
| 2019/0331837 A1* | 10/2019 | Wheatley | G02B 5/305 |
| 2020/0192996 A1* | 6/2020 | Kang | G03F 1/36 |
| 2020/0297193 A1* | 9/2020 | Takahashi | G02B 7/021 |
| 2021/0137360 A1* | 5/2021 | Nagata | G02B 23/26 |
| 2021/0137372 A1* | 5/2021 | Fujimori | A61B 1/0011 |
| 2021/0369086 A1* | 12/2021 | Ogi | H04N 23/555 |
| 2021/0369087 A1* | 12/2021 | Kodama | A61B 1/00096 |
| 2022/0221690 A1* | 7/2022 | Kobayashi | G02B 9/10 |

FOREIGN PATENT DOCUMENTS

| | | |
|---|---|---|
| JP | 6640341 B2 | 2/2020 |
| WO | 2017203593 A1 | 11/2017 |
| WO | 2020003398 A1 | 1/2020 |

\* cited by examiner

IMAGE PICKUP UNIT, ENDOSCOPE, AND METHOD FOR MANUFACTURING IMAGE PICKUP UNIT

CROSS REFERENCE TO RELATED APPLICATION

This application is a continuation application of PCT/JP2022/020189 filed on May 13, 2022, the entire contents of which are incorporated herein by this reference.

BACKGROUND OF THE INVENTION

1. Field of the Invention

The present invention relates to an image pickup unit in which an image sensor is bonded to an optical unit in which a plurality of optical elements are stacked, an endoscope including an image pickup unit in which an image sensor is bonded to an optical unit in which a plurality of optical elements are stacked, and a method for manufacturing an image pickup unit in which an image sensor is bonded to an optical unit in which a plurality of optical elements are stacked.

2. Description of the Related Art

With an image pickup unit to be arranged in a distal end portion of an insertion portion of an endoscope, downsizing and, in particular, reducing a diameter of the image pickup unit is important in order to realize minimal invasion.

Japanese Patent Application Laid-Open Publication No. 2012-18993 discloses an optical unit made of a wafer-level stacked body as a method of manufacturing an extra-thin optical unit in an efficient manner. The optical unit is fabricated by cutting and dividing a bonded wafer in which are stacked a plurality of lens wafers, each of which includes a plurality of lenses, and a plurality of image pickup device wafers, each of which includes a plurality of image pickup devices.

International Publication No. 2017/203593 discloses an image pickup unit in which a notch is formed on a side surface and the notch is filled with resin in order to increase mechanical strength of a wafer-level optical system.

The image pickup unit described above is fabricated by, for example, arranging an image sensor using resin on an exit surface of the wafer-level optical system a notch of which has been filled with resin and subjected to curing and once again subjecting the wafer-level optical system to curing.

SUMMARY OF THE INVENTION

An image pickup unit according to an embodiment of the present invention includes: an optical unit which includes an incidence surface, an exit surface, and four side surfaces, which includes a plurality of stacked optical elements, and in which at least corners of the four side surfaces have a notch being notched from the exit surface toward the incidence surface; an image sensor including a light-receiving surface configured to receive an object image focused by the optical unit; and resin which includes a first region between the light-receiving surface and the exit surface, the first region bonding the optical unit and the image sensor to each other, and a second region filling the notch of the optical unit, and which does not include an interface between the first region and the second region.

An endoscope according to an embodiment of the present invention includes: an insertion portion configured to be inserted into a subject; and an image pickup unit provided in a distal end portion of the insertion portion, wherein the image pickup unit includes: an optical unit which includes an incidence surface, an exit surface, and four side surfaces, which includes a plurality of stacked optical elements, and in which at least corners of the four side surfaces have a notch being notched from the exit surface toward the incidence surface; an image sensor including a light-receiving surface configured to receive an object image focused by the optical unit; and resin which includes a first region between the light-receiving surface and the exit surface, the first region bonding the optical unit and the image sensor to each other, and a second region filling the notch of the optical unit, and which does not include an interface between the first region and the second region.

A method for manufacturing an image pickup unit according to an embodiment of the present invention includes: fabricating a stacked wafer by stacking a plurality of optical element wafers, each of the optical element wafers including an optical element; forming a plurality of grooves on an exit surface of the stacked wafer to a depth that does not reach an incidence surface of the stacked wafer; arranging uncured resin in the plurality of grooves and on the exit surface of the stacked wafer; mounting at least one image sensor on the exit surface of the stacked wafer on which the resin is arranged; solidifying the resin; and cutting the stacked wafer to which the image sensor is bonded along the plurality of grooves filled with the resin.

DETAILED DESCRIPTION OF THE PREFERRED EMBODIMENTS

<Endoscope>

Figure 1:
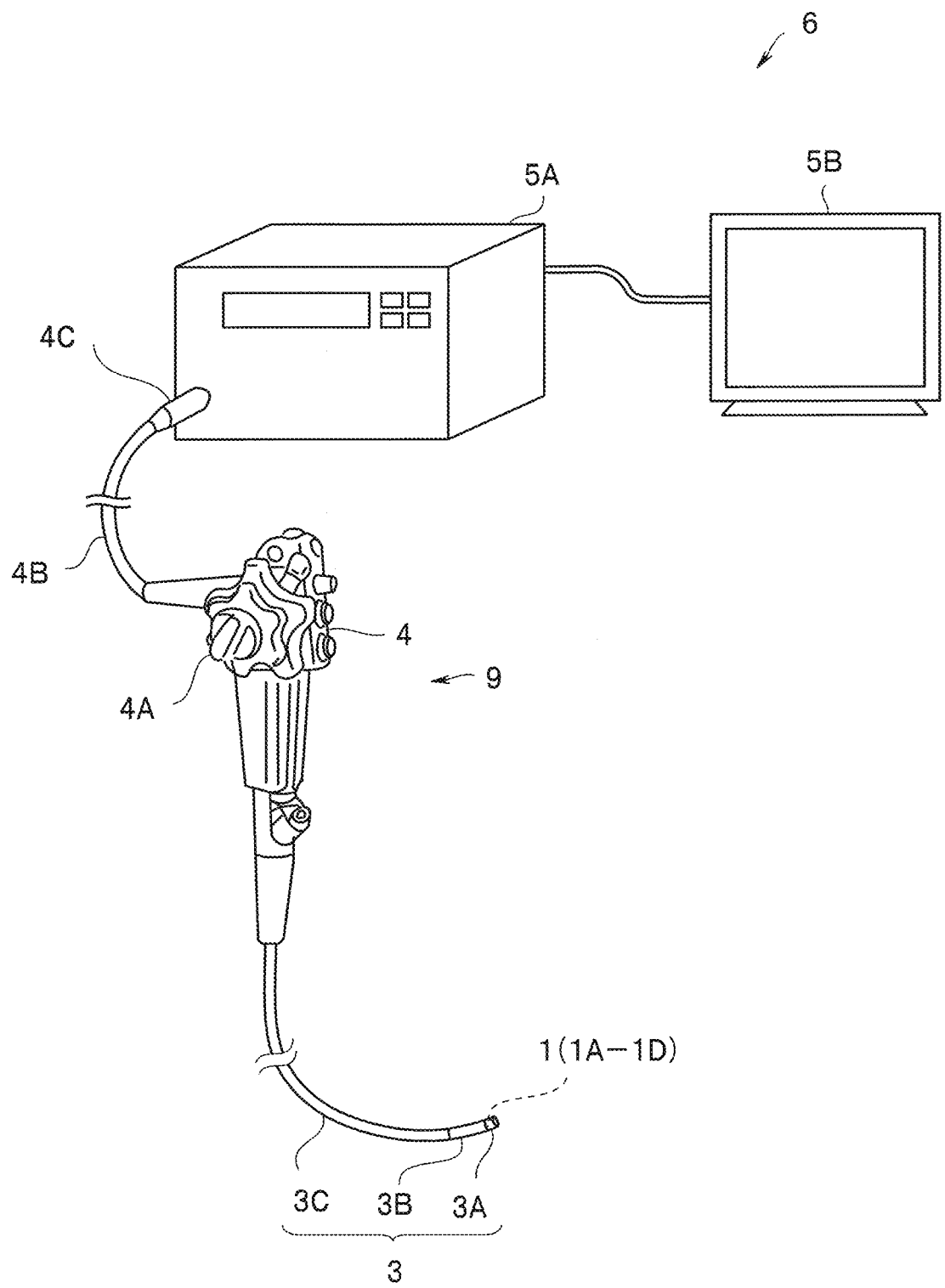
FIG. 1 is a perspective view of an endoscope according to an embodiment.

As shown in FIG. 1, an endoscope 9 according to an embodiment constitutes an endoscope system 6 together with a processor 5A and a monitor 5B.

Note that in the following description, the drawings based on each of the embodiments are schematic in nature. A relationship between a thickness and a width in each portion, a ratio of thicknesses among respective portions, relative angles of respective portions, and the like differ from reality. Even among the drawings, the drawings include portions having a relationship or a ratio among dimensions that differ from each other. Furthermore, illustration of some of the components may be omitted.

The endoscope 9 includes an insertion portion 3, a grasping portion 4 arranged in a proximal end portion of the insertion portion 3, a universal cord 4B extended from the grasping portion 4, and a connector 4C arranged in a proximal end portion of the universal cord 4B. The insertion portion 3 includes a distal end portion 3A, a bending portion 3B which is extended from the distal end portion 3A, which is bendable, and which is used for changing a direction of the distal end portion 3A, and a flexible portion 3C which is extended from the bending portion 3B. A rotatable angle knob 4A which is an operation portion that enables an operator to operate the bending portion 3B is arranged in the grasping portion 4.

The universal cord 4B is connected to the processor 5A by the connector 4C. The processor 5A controls the entire endoscope system 6, performs signal processing on an image pickup signal, and outputs an image signal. The monitor 5B displays the image signal outputted by the processor 5A as an endoscopic image. Although the endoscope 9 is a flexible scope, the endoscope 9 may be a rigid scope instead. In addition, the endoscope 9 may be used in either medical application or industrial application.

The endoscope 9 includes the insertion portion 3 configured to be inserted into a subject and an image pickup unit 1 (1A to 1D) which is provided in the distal end portion 3A of the insertion portion 3.

First Embodiment

Figure 2:
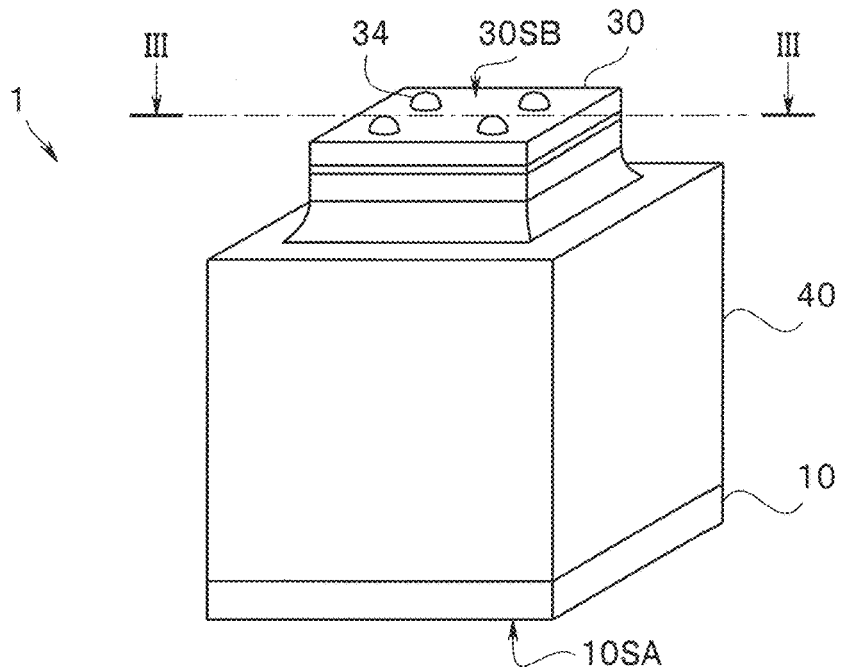
FIG. 2 is a perspective view of an image pickup unit according to a first embodiment.
Figure 3:
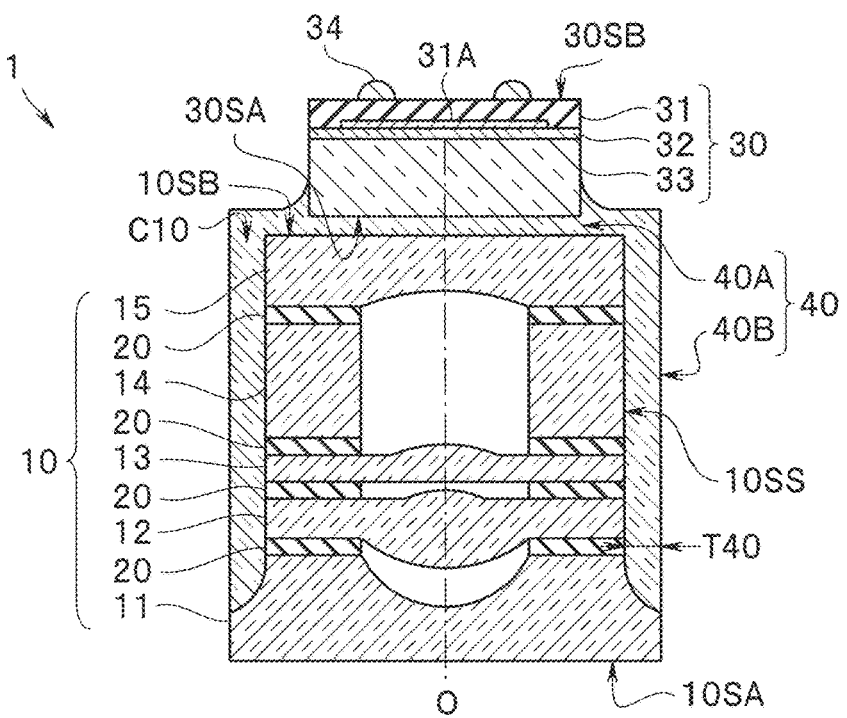
FIG. 3 is a sectional view taken along line III-III in FIG. 2 of the image pickup unit according to the first embodiment.
Figure 4:
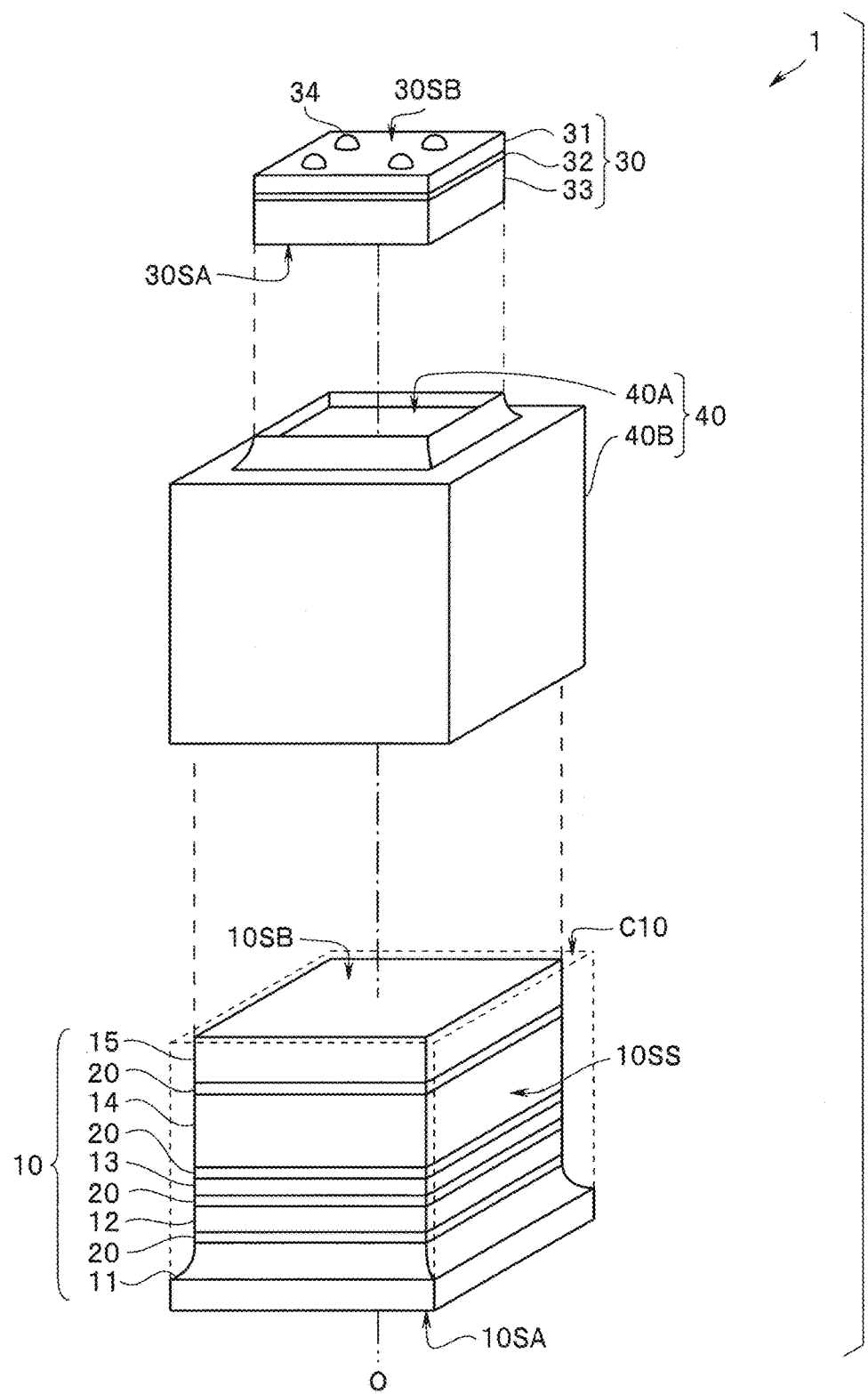
FIG. 4 is an exploded view of the image pickup unit according to the first embodiment.

FIGS. 2 to 4 show the image pickup unit 1 according to the present embodiment. The image pickup unit 1 includes an optical unit 10, an image sensor 30, and resin 40. The image sensor 30 that is bonded to the optical unit 10 by the resin 40 receives an object image focused by the optical unit 10. Reference sign "O" denotes an optical axis of the optical unit 10.

As will be described later, the resin 40 that is transparent curable resin not only includes a first region 40A which bonds the image sensor 30 but also includes a second region 40B which is arranged in a notch C10 of a side surface 10SS of the optical unit 10. The first region 40A and the second region 40B are a continuous integrated object. In other words, the first region 40A and the second region 40B do not have an interface between the regions.

The image sensor 30 includes a light-receiving surface 30SA and a rear surface 30SB on an opposite side to the light-receiving surface 30SA. The image sensor 30 includes an image pickup device 31, a cover glass 33, and an adhesion layer 32. The image pickup device 31 includes a light-receiving unit 31A made of a CCD or a CMOS, and a plurality of electrodes 34 connected to the light-receiving unit 31A via through wirings (not illustrated) are arranged on the rear surface 30SB. The image pickup device 31 receives a drive signal and transmits an image pickup signal using the wiring (not illustrated) connected to each of the plurality of electrodes 34. The image pickup device 31 may be either a front-illuminated image sensor or a back-illuminated image sensor.

The optical unit 10 includes an incidence surface 10SA, an exit surface 10SB on an opposite side to the incidence surface 10SA, and four side surfaces 10SS. In the optical unit 10, a plurality of optical elements 11 to 15 are bonded by resin 20 arranged between the optical elements.

For example, a first optical element 11 is a plano-concave lens including the incidence surface 10SA. A second optical element 12 is a convex-convex lens. A third optical element 13 is a plano-convex lens. A fourth optical element 14 is a spacer element with a through-hole to be an optical path at center of the element. A fifth optical element 15 is a concave-plano lens including the exit surface 10SB.

Although not illustrated, the optical unit 10 also includes other optical elements such as an infrared cut filter, a flare diaphragm, and an aperture stop. In addition, the optical element constituting the lenses may be a hybrid lens element in which a resin lens is arranged on a transparent substrate. A configuration of the optical unit 10 is appropriately selected according to specifications.

The optical unit 10 includes the notch C10 which is notched from the exit surface 10SB toward the incidence surface 10SA on the four side surfaces 10SS. The notch C10 reaches the side surface of the first optical element 11 which includes the incidence surface 10SA but does not reach the incidence surface 10SA. The notch C10 of the optical unit 10 is formed up to midway toward the side surface 10SS of the first optical element 11 which includes the incidence surface 10SA.

Owing to the notch C10, the incidence surface 10SA of the first optical element 11 is larger than a main surface of any of the other optical elements 12 to 15 such as the exit surface 10SB of the fifth optical element.

In addition, the notch C10 is filled with the resin 40. The resin 40 is not only arranged in the notch C10 and on the exit surface 10SB which bonds the image sensor 30 and the optical unit 10 to each other but also arranged on the side surface 10SS (notch C10).

Since the resin 40 made of, for example, epoxy resin is arranged in the notch C10 of the side surface 10SS, mechanical strength of the optical unit 10 is improved. The optical unit 10 is extra thin, with the incidence surface 10SA being, for example, a 5-mm square. However, the optical unit 10 reinforced by the resin 40 has no risk of damage to a bonding surface by becoming detached or broken even when subjected to stress. In addition, since the resin 40 is accommodated in the notch C10, an external dimension of the optical unit 10 is not increased by arranging the resin 40 on the side surface 10SS and the optical unit 10 can be made extra thin.

In order to secure mechanical strength, for example, the resin 40 is preferably hard resin with a Vickers hardness (ISO 6507-1) Hv of 5 GPa or higher. In addition, a thickness T40 of the resin 40 of the side surface 10SS is preferably 5 μm or more and more preferably 20 μm or more.

In order to secure mechanical strength, the notch C10 preferably reaches the side surface of the first optical element 11 which includes the incidence surface 10SA among the plurality of optical elements.

With a conventional image pickup unit with a notch filled with resin, the notch is first filled with the resin and subjected to curing, the resin is then arranged on an exit surface of an optical system, an image sensor is mounted, and the image pickup unit is subjected to curing once again. In other words, the conventional image pickup unit requires that two resin arranging steps and two curing steps be performed.

In the optical unit 10, the resin 40 not only secures mechanical strength but also bonds the image sensor 30. As will be described later, the resin 40 is configured to a state of including two functions due to one resin arranging step and one curing step with respect to a stacked wafer to become the optical unit 10.

In other words, resin that bonds the image sensor 30 and the optical unit 10 to each other and resin that seals side surfaces of the optical unit 10 are made of a same integrally-arranged material.

Therefore, the image pickup unit 1 can be readily manufactured. In addition, it goes without saying that productivity of the endoscope 9 equipped with the image pickup unit 1 in the distal end portion 3A is high.

<Method for Manufacturing Optical Unit>

Figure 5:
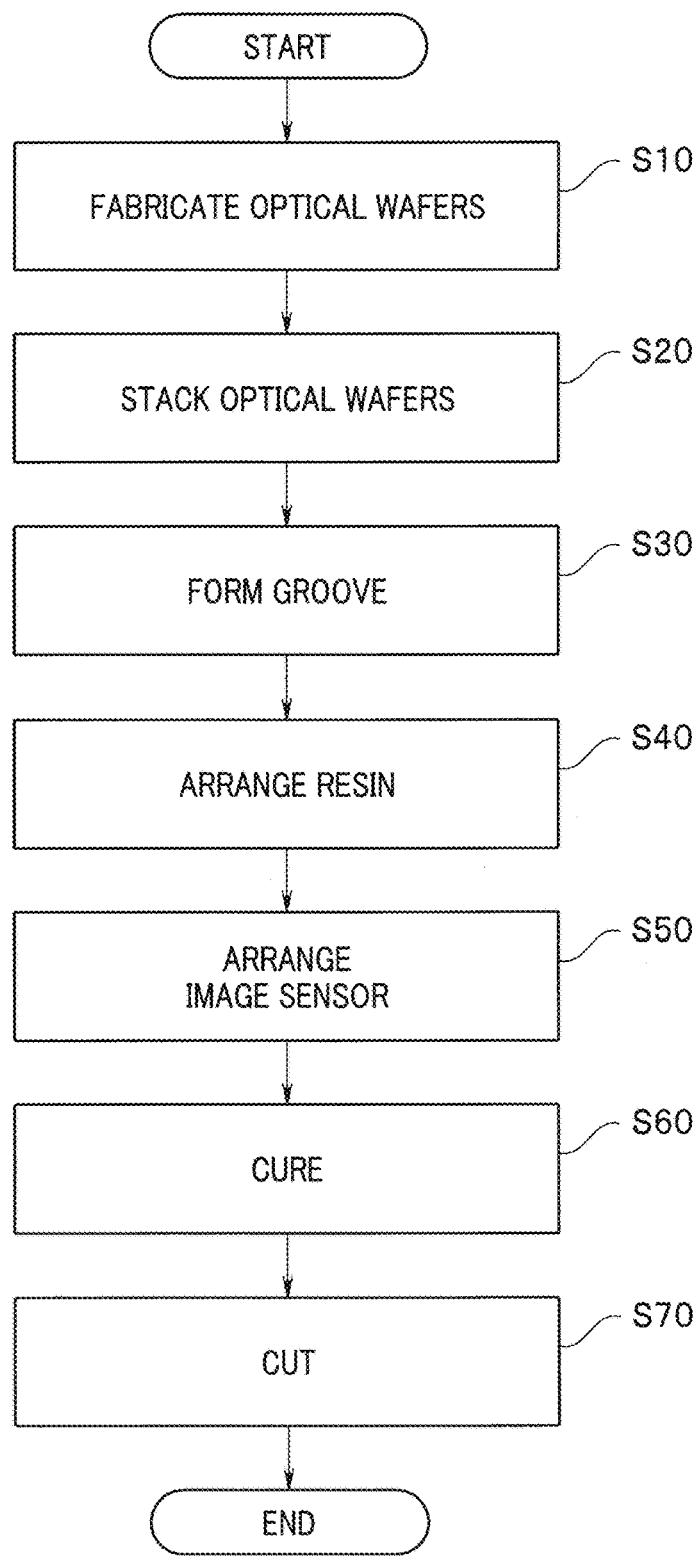
FIG. 5 is a flowchart for describing a method for manufacturing the image pickup unit according to the first embodiment.

Next, a method for manufacturing the image pickup unit according to the embodiment will be described along a flowchart shown in FIG. 5.

<Step S10> Optical Wafer Fabricating Step

A plurality of optical element wafers 11W to 15W (refer to FIG. 6), each of which includes a plurality of optical elements 11 to 15, are fabricated.

<Step S20> Optical Wafer Stacking Step

A stacked wafer 10W (refer to FIG. 6) is fabricated by stacking and bonding the plurality of optical element wafers 11W to 15W. The plurality of optical element wafers 11W to 15W are bonded by the resin 20 which is energy-curable.

<Step S30> Groove Forming Step

Figure 6:
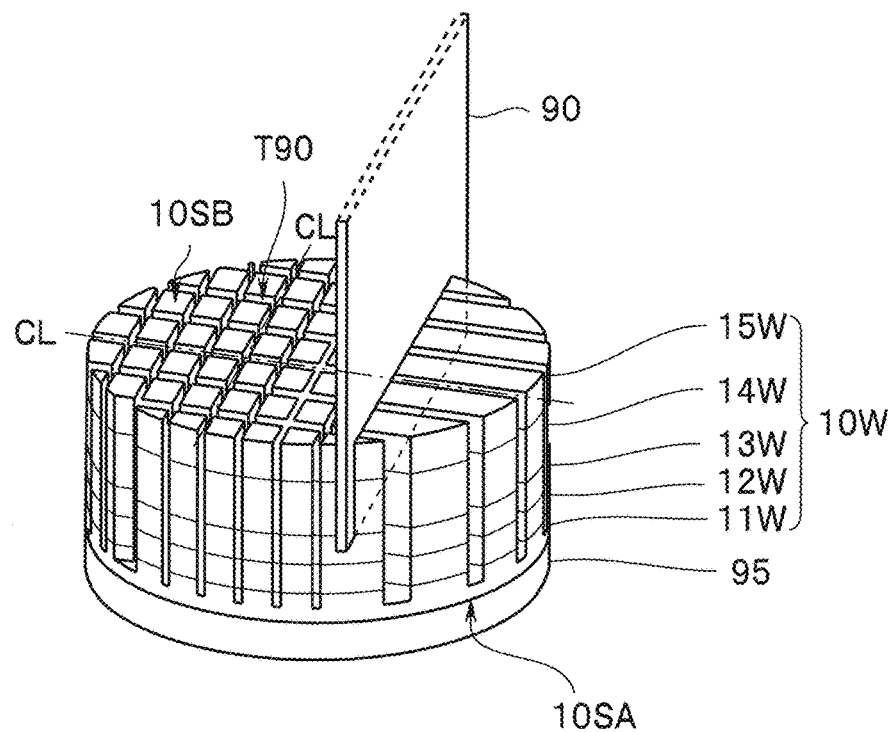
FIG. 6 is a perspective view of a groove forming step of the image pickup unit according to the first embodiment.
Figure 7:
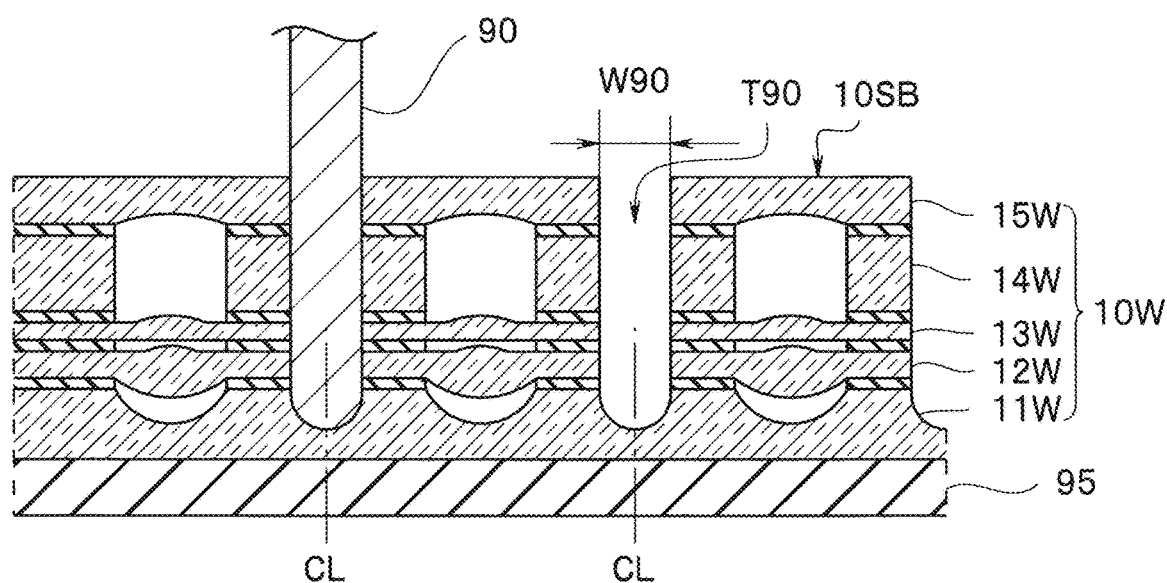
FIG. 7 is a sectional view of the groove forming step of the image pickup unit according to the first embodiment.

As shown in FIGS. 6 and 7, the incidence surface 10SA of the stacked wafer 10W is fixed to, for example, a dicing tape 95. In addition, a plurality of grooves T90 with a depth that does not reach the incidence surface 10SA is formed on the exit surface 10SB of the stacked wafer 10W along a cut line CL for dividing the stacked wafer 10W. In other words, the plurality of grooves T90 which open on the exit surface 10SB of the stacked wafer 10W are formed.

Note that the cut line CL is a cut line for dividing the stacked wafer 10W into image pickup units 1 and is made up of a plurality of mutually orthogonal lines. The optical elements 11 to 15 are positioned in each of regions enclosed by four cut lines CL.

The grooves T90 are formed so as to have an opening width of W90 and to have a bottom surface in the first element wafer 11W that is stacked at a bottommost position of the stacked wafer 10W by a first dicing blade 90 a width of which (cutting margin) is W90. For example, when a thickness of the first element wafer 11W is 200 μm, the grooves T90 are formed to a depth that is half (100 μm) of the thickness of the first element wafer 11W. Note that groove forming may be performed by etching or the like instead of machining.

When the stacked wafer 10W is cut, the grooves T90 become the notch C10 of the side surface 10SS of the image pickup unit 1. When the grooves T90 reach the incidence surface 10SA, the image pickup unit 1 can no longer be readily detached from the dicing tape 95 after being cut. Therefore, preferably, the depth of the grooves T90 (notch C10) does not reach the incidence surface 10SA.

<Step S40> Resin arranging step

Figure 8:
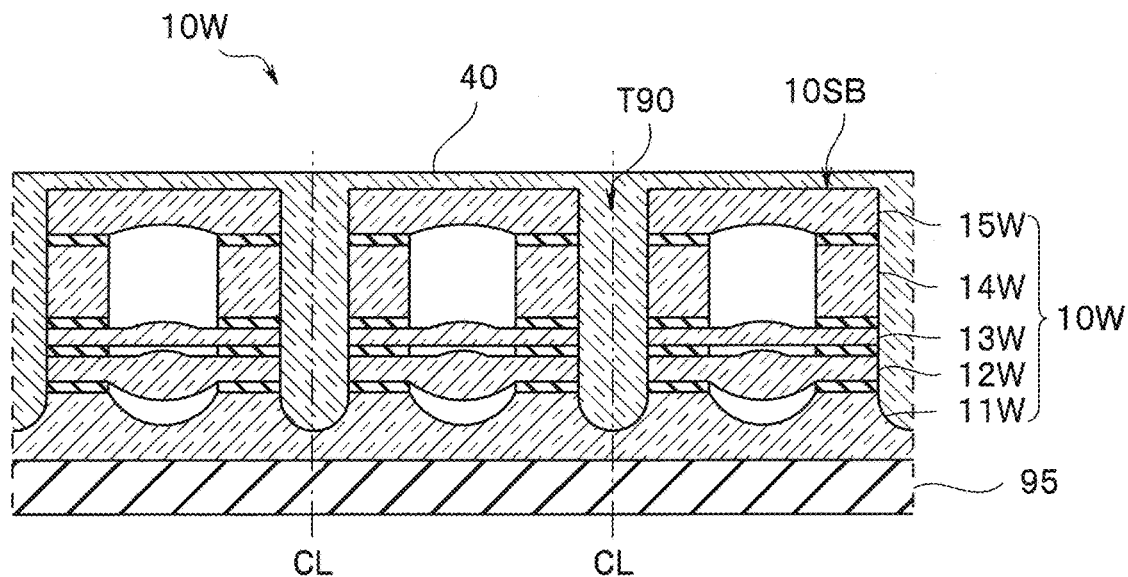
FIG. 8 is a sectional view of a resin arranging step of the image pickup unit according to the first embodiment.

As shown in FIG. 8, the uncured resin 40 is arranged in the plurality of grooves T90 and on the exit surface 10SB of the stacked wafer 10W. For example, using an ink-jet method, the grooves T90 are also filled with the resin 40. In other words, since the resin 40 of the first region 40A on the exit surface 10SB to which the image sensor 30 is mounted and the resin 40 of the second region 40B which fills the grooves T90 (the notch C10 of the optical unit 10) are simultaneously arranged, the resin 40 does not include an interface between the first region 40A and the second region 40B.

Note that even when the first region 40A and the second region 40B are made of the same resin, an interface exists between the two regions if resins of the two regions are arranged in different steps. For example, a boundary surface can be observed when observing a cross section. Due to the absence of an interface between the first region 40A and the second region 40B, the first region 40A and the second region 40B can be determined to have been applied simultaneously.

The resin 40 is transparent energy-curable resin. In an energy-curable resin, a cross-linking reaction or a polymerization reaction is promoted when receiving energy such as heat, ultraviolet light, or an electron beam from outside. For example, the resin 40 is ultraviolet-curable silicone resin, epoxy resin, or acrylic resin.

Note that "transparent" means that levels of light absorption and scattering of the material are low enough to withstand use in a wavelength range of the image pickup unit 1.

<Step S50> Image Sensor Mounting Step

Figure 9:
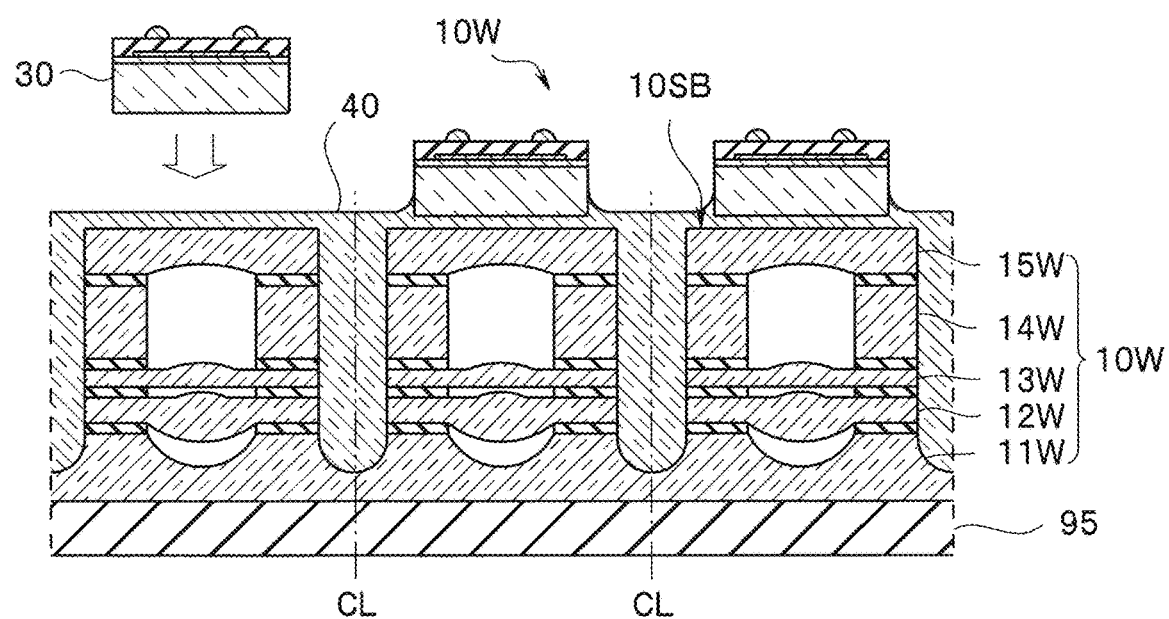
FIG. 9 is a sectional view of an image sensor mounting step of the image pickup unit according to the first embodiment.

As shown in FIG. 9, the image sensor 30 is mounted to the exit surface 10SB of the stacked wafer 10W on which the resin 40 is arranged. The resin 40 fills the first region 40A between the light-receiving surface 30SA of the image sensor 30 and the exit surface 10SB.

<Step S60> Curing Step

The resin 40 of the stacked wafer 10W to which the image sensor 30 is mounted is cured and solidified. In other words, the resin 40 of the first region 40A between the light-receiving surface 30SA of the image sensor 30 and the exit surface 10SB and the resin 40 of the second region 40B which fills the grooves T90 (the notch C10 of the optical unit 10) are simultaneously cured.

For example, in a case of ultraviolet-curable/thermosetting combined resin, after the exit surface 10SB of the stacked wafer 10W is irradiated with ultraviolet rays, heat treatment is performed using a heating furnace or a hot plate.

<Step S70> Cutting Step

Figure 10:
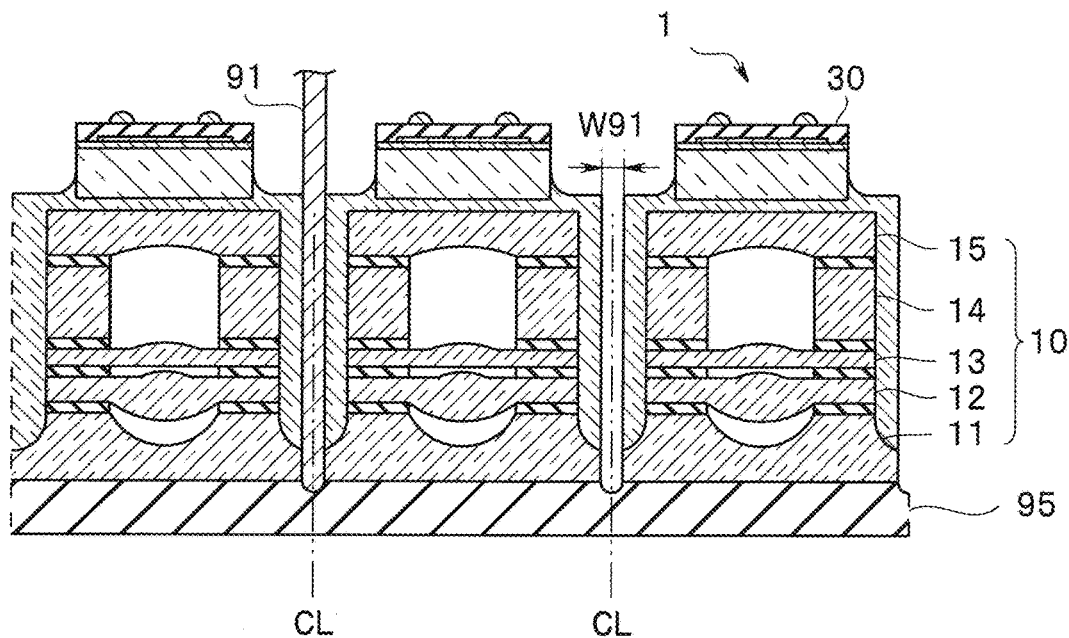
FIG. 10 is a sectional view of a cutting step of the image pickup unit according to the first embodiment.

As shown in FIG. 10, the stacked wafer 10W to which the image sensor 30 is bonded is cut along the plurality of grooves T90 (cut lines CL) filled with the resin 40.

When the stacked wafer 10W is cut by a second dicing blade 91 with a width (cutting margin) of W91, the stacked wafer 10W is divided into a plurality of the image pickup units 1. The width W91 of the cutting margin is smaller than the width W90 of the grooves. Therefore, a cutting surface of the stacked wafer 10W or, in other words, the side surface 10SS of the image pickup unit 1 is made up of a cutting surface of a part of the first element wafer 11W and a cutting surface of the resin 40. Laser dicing or plasma dicing may be used for the cutting.

With the manufacturing method according to the present embodiment, the image pickup unit 1 mechanical strength of which is improved by the resin 40 can be efficiently manufactured.

Modifications of First Embodiment

Next, image pickup units 1A and 1B according to modifications of the first embodiment will be described. Since the image pickup units 1A and 1B are similar to the image pickup unit 1 and produce same effects, components with same functions will be assigned same reference signs and descriptions of such components will be omitted.

First Modification of First Embodiment

Figure 11:
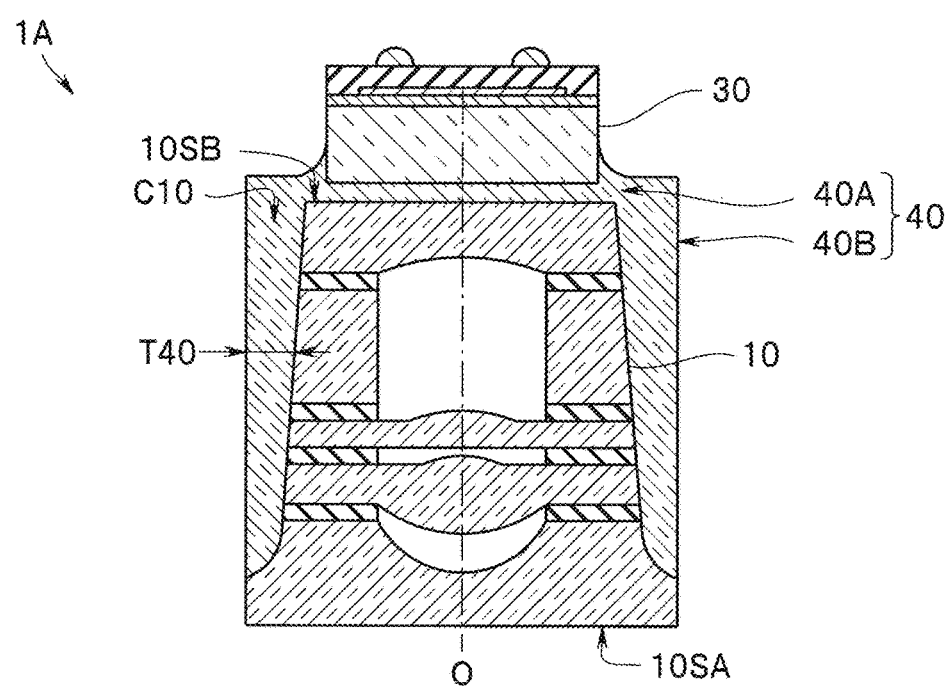
FIG. 11 is a sectional view of an image pickup unit according to a first modification of the first embodiment.

As shown in FIG. 11, in the image pickup unit 1A according to the present modification, a thickness T40 of the resin 40 in the second region 40B is configured so as to continuously decrease from the exit surface 10SB toward the incidence surface 10SA.

In a method for manufacturing the image pickup unit 1A, in the groove forming step S30, since a groove a wall surface of which is inclined with respect to the exit surface 10SB is formed, an opening width of the groove T90 is wider than an internal width of the groove T90. The groove T90 described above can be readily formed by, for example, selecting a shape of the first dicing blade 90.

With the image pickup unit 1A, the groove T90 can be more readily filled with the resin 40 in the resin arranging step (S40) than the image pickup unit 1.

Second Modification of First Embodiment

Figure 12:
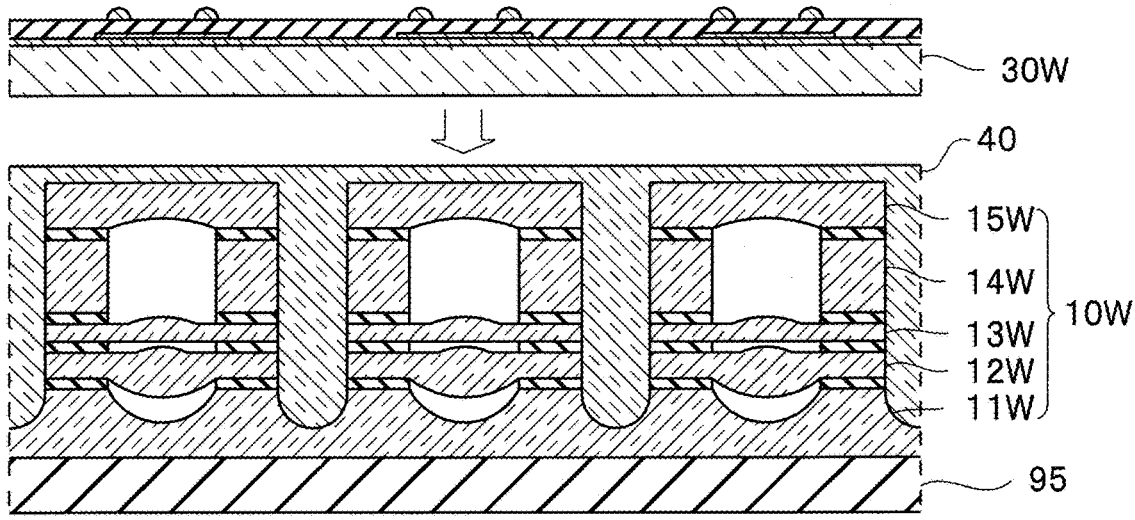
FIG. 12 is a sectional view of an image sensor mounting step of an image pickup unit according to a second modification of the first embodiment.

As shown in FIG. 12, in a method for manufacturing the image pickup unit 1B, in the image sensor mounting step (S50), a sensor block 30W including a plurality of image sensors 30B is mounted to the exit surface 10SB of the stacked wafer 10W. The sensor block 30W may be a circular wafer or a rectangular block cut from a circular wafer.

Figure 13:
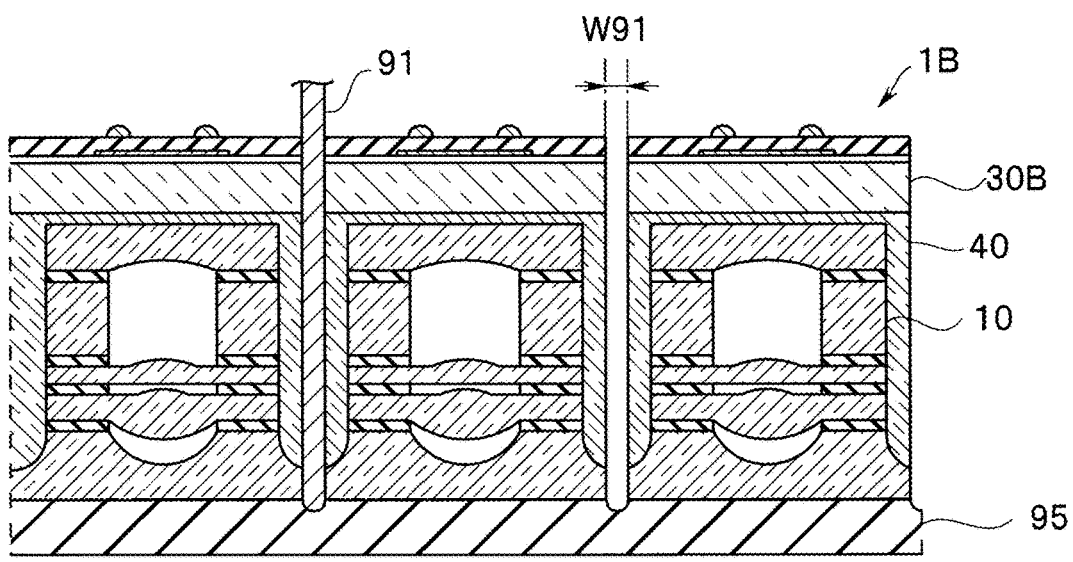
FIG. 13 is a sectional view of a cutting step of the image pickup unit according to the second modification of the first embodiment.

As shown in FIG. 13, in the image pickup unit 1B, an outer dimension of the image sensors 30B is the same as an outer dimension of the optical unit 10 including the resin 40.

Second Embodiment

Since an image pickup unit 1C according to a second embodiment is similar to the image pickup units 1 to 1B and produces same effects, same components will be assigned same reference signs and descriptions of such components will be omitted.

Figure 14:
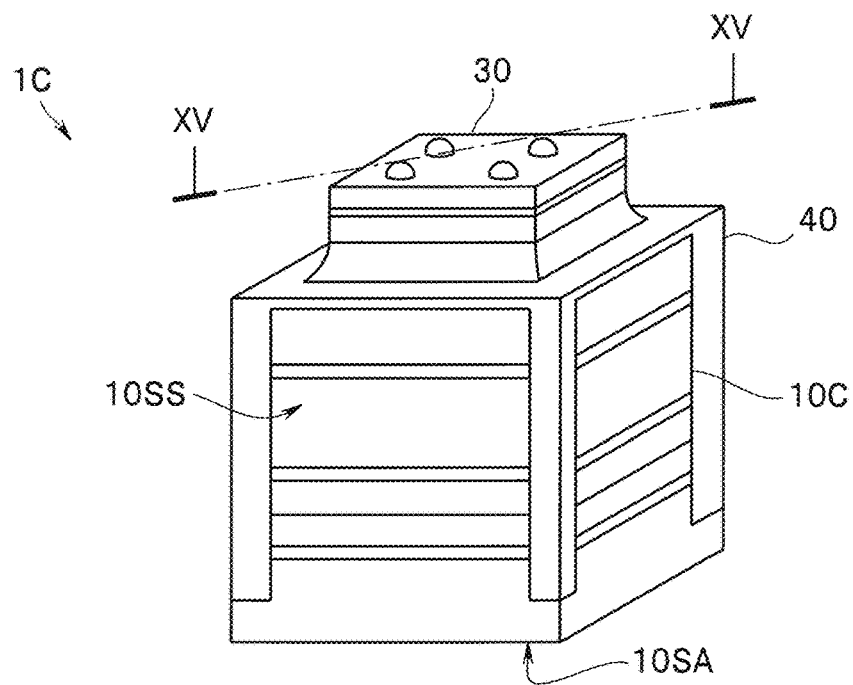
FIG. 14 is a perspective view of an image pickup unit according to a second embodiment.
Figure 15:
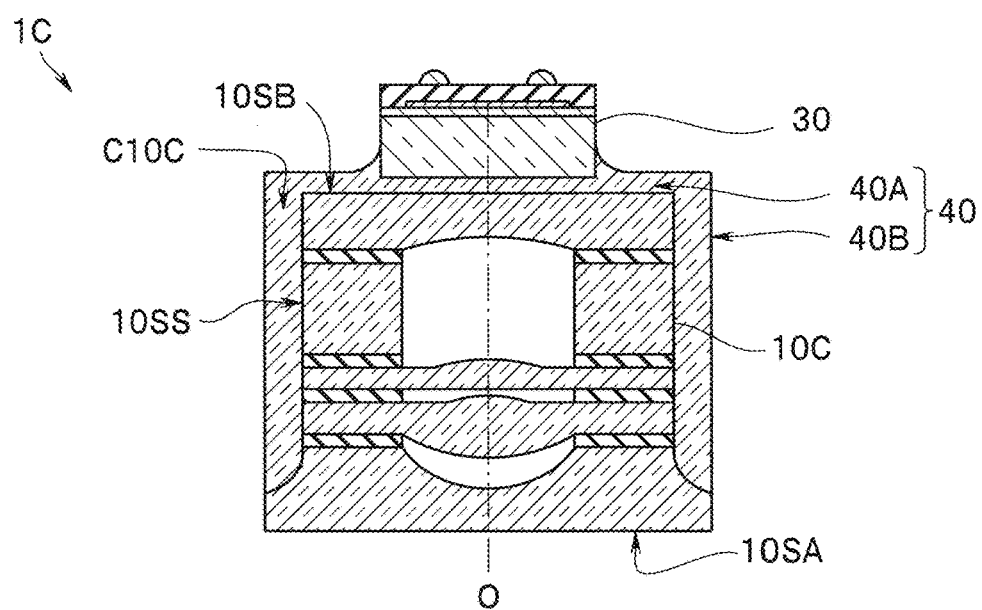
FIG. 15 is a sectional view taken along line XV-XV in FIG. 14 of the image pickup unit according to the second embodiment.
Figure 16:
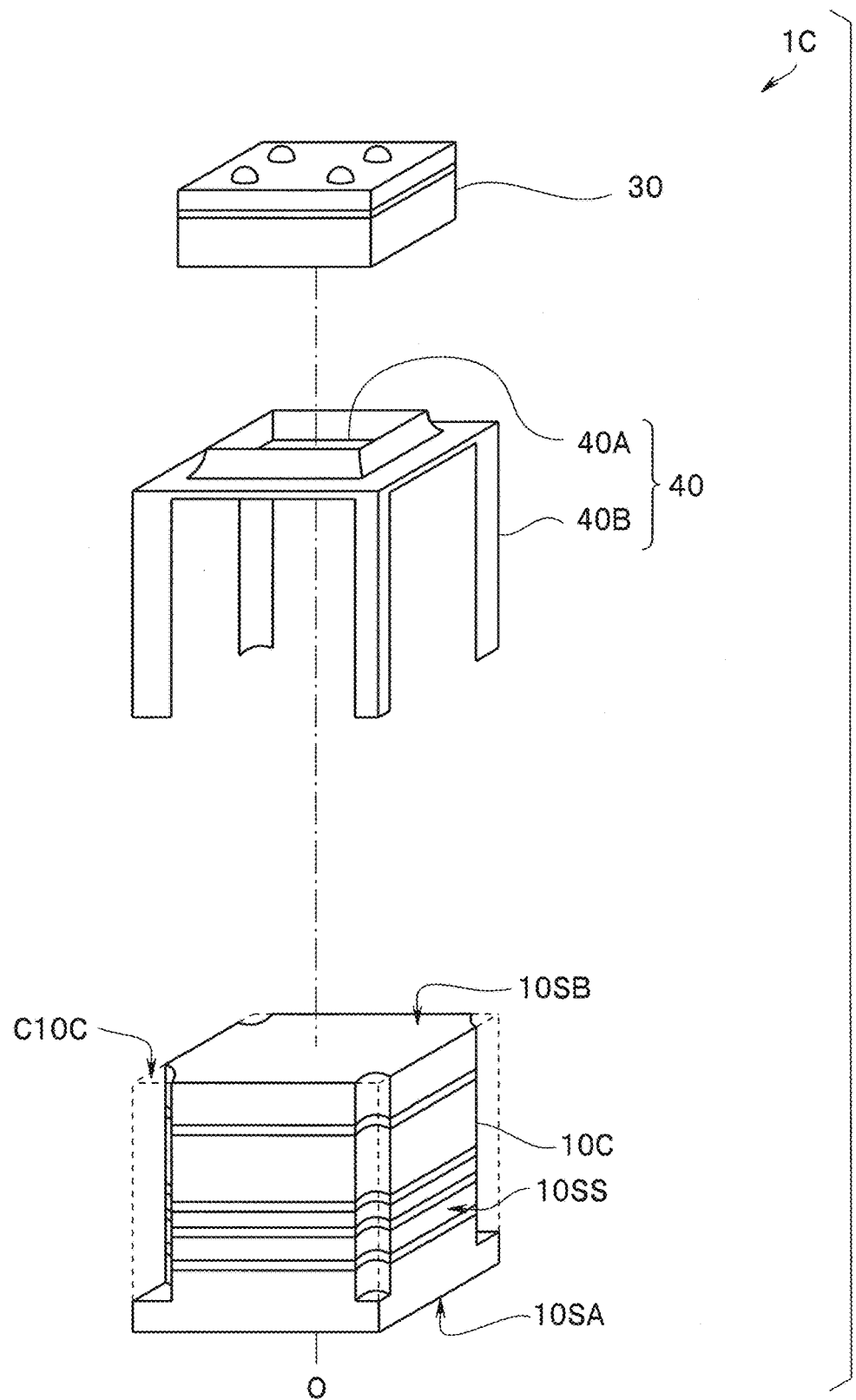
FIG. 16 is an exploded view of the image pickup unit according to the second embodiment.

As shown in FIGS. 14 to 16, in the image pickup unit 1C according to the present embodiment, only each corners of the four side surfaces 10SS or, in other words, each ridges where two side surfaces intersect each other of an optical unit 10C includes a notch C10C which is notched from the exit surface 10SB toward the incidence surface 10SA. The resin 40 that fills the notch C10C is resin in the second region 40B.

Mechanical strength of the image pickup unit 1C is improved by the resin 40 in the second region 40B. In addition, as will be described later, the image pickup unit 1C can be readily manufactured.

Figure 17:
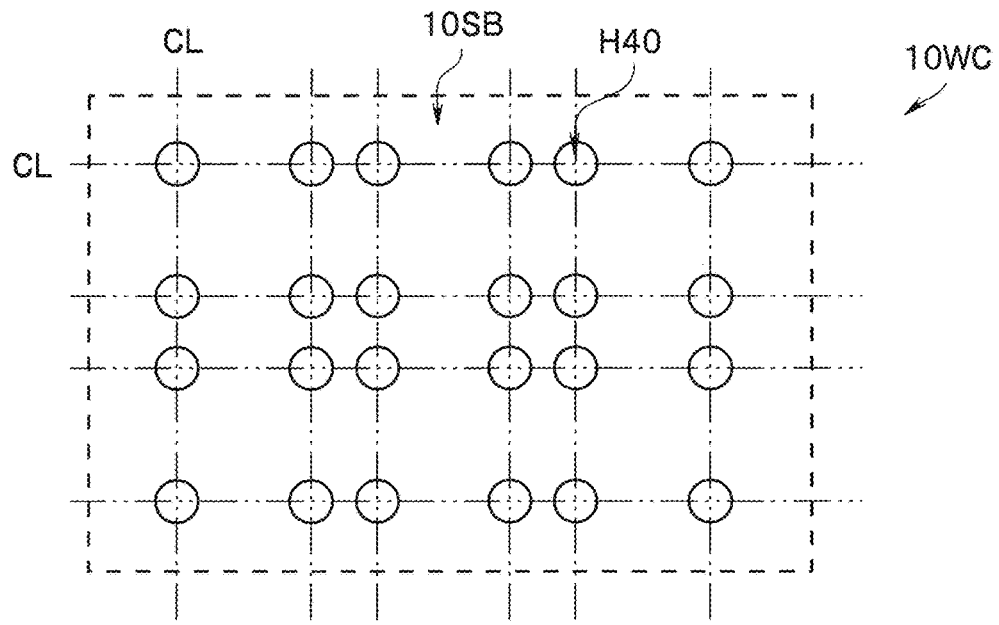
FIG. 17 is a top view of a hole forming step of the image pickup unit according to the second embodiment.

In a method for manufacturing the image pickup unit 1C, a hole forming step is performed in place of the groove forming step (S30) of the image pickup unit 1. As shown in FIG. 17, a plurality of bottomed holes H40 are formed on the exit surface 10SB of a stacked wafer 10WC. The holes H40 are respectively formed at intersections of the cut line CL or, in other words, four corners of the optical element after being cut. A depth of the holes H40 preferably reaches the side surface of the first optical element 11 which includes the incidence surface 10SA but does not reach the incidence surface 10SA.

In the resin arranging step (S40), the uncured resin 40 is arranged in the plurality of holes H40 and on the exit surface 10SB of the stacked wafer 10WC. Note that an area parallel to the exit surface 10SB of the holes H40 preferably continuously decreases from the exit surface 10SB toward the incidence surface 10SA to enable the holes H40 to be more readily filled with resin.

Since the resin 40 of the first region 40A on the incidence surface 10SA to which the image sensor 30 is mounted and the resin 40 of the second region 40B which fills the grooves T90 (the notch C10C of the optical unit 10) are simultaneously arranged, the resin 40 does not include an interface between the first region 40A and the second region 40B.

In addition, in the curing step (S60), the resin 40 of the first region 40A on the incidence surface 10SA to which the image sensor 30 is mounted and the resin 40 of the second region 40B which fills the holes H40 (the notch C10C of the optical unit 10) are simultaneously cured.

Figure 18:
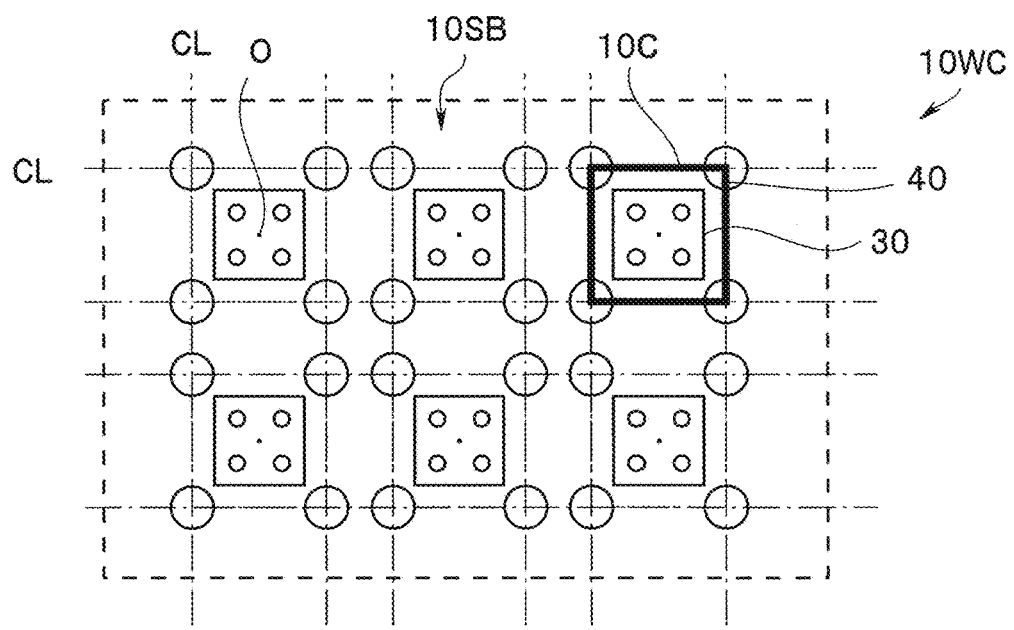
FIG. 18 is a top view of a cutting step of the image pickup unit according to the second embodiment.

As shown in FIG. 18, in the cutting step (S70), the stacked wafer 10WC to which the image sensor 30 is bonded is cut along the cut line CL which straddles the plurality of holes H40 filled with the resin 40.

With the manufacturing method according to the present embodiment, the image pickup unit 1C mechanical strength of which is improved by the resin 40 can be efficiently manufactured.

Modification of Second Embodiment

Since an image pickup unit 1D according to the present modification is similar to the image pickup unit 1C and produces same effects, same components will be assigned same reference signs and descriptions of such components will be omitted.

Figure 19:
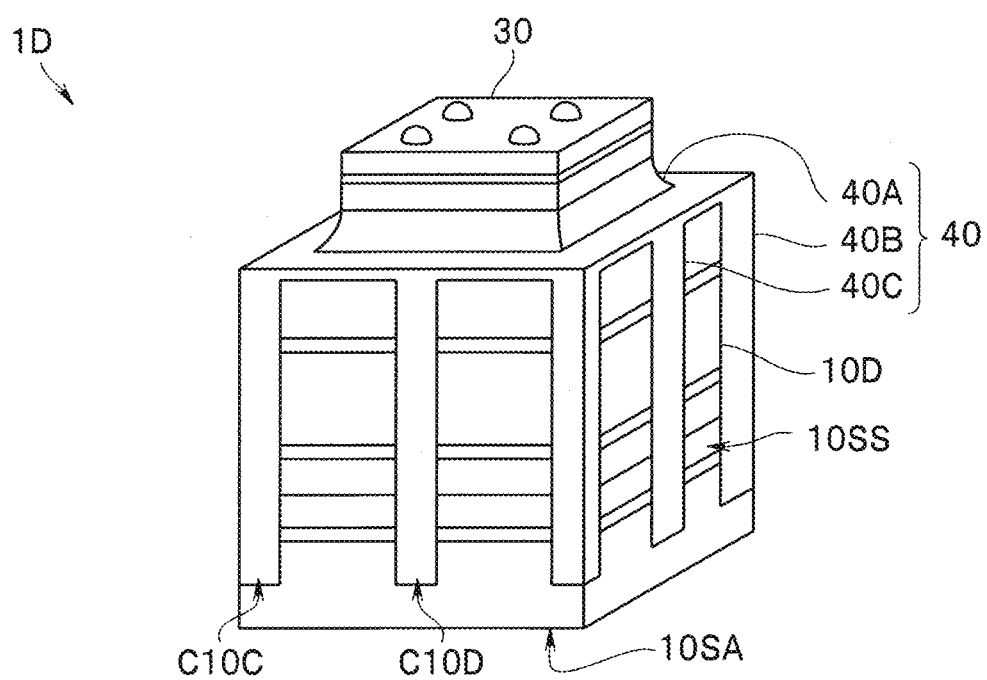
FIG. 19 is a perspective view of an image pickup unit according to a first modification of the second embodiment.

As shown in FIG. 19, the image pickup unit 1D includes a notch C10D at not only corners of the side surfaces 10SS but also at approximately center of the side surfaces 10SS of an optical unit 10D. The notch C10D is filled with resin 40C of a third region. In other words, the resin 40 includes resin 40 in a first region 40A, resin 40 in a second region 40B, and the resin 40 in the third region 40C.

The notch C10D is formed by a hole formed in a stacked wafer in a same manner as the notch C10C at the corners of the side surfaces 10SS. The resin 40 is simultaneously arranged on the exit surface 10SB, in the notch C10C, and in the notch C10D and is simultaneously cured. The resin 40 does not include interfaces among the first region 40A, the second region 40B, and the third region 40C.

Mechanical strength of the image pickup unit 1D is more improved than the image pickup unit 1C.

It goes without saying that an endoscope including the image pickup units 1A to 1D in a distal end portion of the endoscope shares the effects of the endoscope 9 including the image pickup unit 1 and also shares the respective effects of the image pickup units 1A to 1D.

The present invention is not limited to the embodiments and the like described above and various modifications, alterations, and the like can be made within the scope of the gist of the present invention.

What is claimed is:

1. An image pickup unit, comprising:
   an optical unit including:
      an incidence surface,
      an exit surface,
      four side surfaces, and
      a plurality of stacked optical elements, and in which at least corners of the four side surfaces have a notch having a depth extending toward an optical axis of the stacked optical elements and a length extending from the exit surface toward the incidence surface;
   an image sensor including a light-receiving surface configured to receive an object image focused by the optical unit; and
   resin including:
      a first region between the light-receiving surface and the exit surface, the first region bonding the optical unit and the image sensor to each other, and
      a second region disposed in the notch of the optical unit,
   wherein the resin does not include an interface between the first region and the second region.

2. The image pickup unit according to claim 1, wherein in the optical unit, the four side surfaces are notched.

3. The image pickup unit according to claim 1, wherein in the optical unit, corners of the four side surfaces are notched.

4. The image pickup unit according to claim 1, wherein a thickness of the resin of the second region continuously decreases from the exit surface toward the incidence surface.

5. The image pickup unit according to claim 1, wherein the notch of the optical unit reaches a side surface of a first optical element that includes the incidence surface among the plurality of optical elements but does not reach the incidence surface.

6. An endoscope comprising:
   an insertion portion configured to be inserted into a subject; and
   an image pickup unit provided in a distal end portion of the insertion portion,
   wherein the image pickup unit includes an optical unit including:
      an incidence surface,
      an exit surface,
      four side surfaces,
      a plurality of stacked optical elements, and in which at least corners of the four side surfaces have a notch having a depth extending toward an optical axis of the stacked optical elements and a length extending from the exit surface toward the incidence surface;
   an image sensor including a light-receiving surface configured to receive an object image focused by the optical unit; and
   resin including:
      a first region between the light-receiving surface and the exit surface, the first region bonding the optical unit and the image sensor to each other, and
      a second region filling the notch of the optical unit,
   wherein the resin does not include an interface between the first region and the second region.

7. A method for manufacturing an image pickup unit comprising:
   fabricating a stacked wafer by stacking a plurality of optical element wafers, each of the optical element wafers including an optical element;
   forming a plurality of grooves on an exit surface of the stacked wafer to a depth that does not reach an incidence surface of the stacked wafer;
   arranging uncured resin in the plurality of grooves and on the exit surface of the stacked wafer;
   mounting at least one image sensor on the exit surface of the stacked wafer on which the resin is arranged;
   solidifying the resin; and
   cutting the stacked wafer to which the image sensor is bonded along the plurality of grooves filled with the resin.

8. The method for manufacturing an image pickup unit according to claim 7, wherein
   a sensor block including a plurality of image sensors is mounted to the exit surface.

9. A method for manufacturing an image pickup unit comprising:
   fabricating a stacked wafer including an incidence surface and an exit surface on an opposite side to the incidence surface by stacking a plurality of optical element wafers, each of the optical element wafers including an optical element;
   forming a hole with a depth that does not reach the incidence surface at corners of the optical element of the exit surface of the stacked wafer;
   arranging uncured resin on the exit surface and in the hole of the stacked wafer;
   mounting at least one image sensor on the exit surface on which the resin is arranged;
   solidifying the resin; and
   cutting the stacked wafer to which the image sensor is bonded along a cut line that straddles the hole filled with the resin.

10. The method for manufacturing an image pickup unit according to claim 9, wherein
   an area parallel to the exit surface of the hole continuously decreases from the exit surface toward the incidence surface.

* * * * *